US011625323B2

(12) United States Patent
Ambula et al.

(10) Patent No.: US 11,625,323 B2
(45) Date of Patent: Apr. 11, 2023

(54) GENERATING AND USING SESSION TABLES FOR SESSION-BASED MEMORY MANAGEMENT

(71) Applicant: Micron Technology, Inc., Boise, ID (US)

(72) Inventors: Sharath Chandra Ambula, Mancherial (IN); Sushil Kumar, Hyderabad (IN); David Aaron Palmer, Boise, ID (US); Venkata Kiran Kumar Matturi, Khammam (IN); Sri Ramya Pinisetty, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/113,999

(22) Filed: Dec. 7, 2020

(65) Prior Publication Data

US 2022/0179781 A1 Jun. 9, 2022

(51) Int. Cl.
*G06F 12/02* (2006.01)
*G06F 12/0831* (2016.01)

(52) U.S. Cl.
CPC ...... *G06F 12/0246* (2013.01); *G06F 12/0292* (2013.01); *G06F 12/0833* (2013.01); *G06F 2212/7201* (2013.01)

(58) Field of Classification Search
CPC ............ G06F 12/0246; G06F 12/0292; G06F 12/0833; G06F 2212/7201
See application file for complete search history.

(56) References Cited

U.S. PATENT DOCUMENTS

| | | | | |
|---|---|---|---|---|
| 6,715,057 B1 * | 3/2004 | Kessler | ............... | G06F 12/1009 711/207 |
| 10,997,080 B1 * | 5/2021 | Eliash | ................. | G06F 12/0246 |
| 2013/0132650 A1 * | 5/2013 | Choi | ................... | G06F 12/0246 711/103 |
| 2017/0147499 A1 * | 5/2017 | Mohan | .................... | G06F 12/10 |

\* cited by examiner

*Primary Examiner* — Tasnima Matin
(74) *Attorney, Agent, or Firm* — Holland & Hart LLP

(57) ABSTRACT

Methods, systems, and devices for session-based memory operation are described. A memory system may determine that a logical address targeted by a read command is associated with a session table. The memory system may write the session table to a cache based on the logical address being associated with the session table. After writing the session table to the cache, the memory system may use the session table to determine one or more logical-to-physical (L2P) tables and write the one or more L2P tables to the cache. The memory system may use the L2L tables to perform address translation for logical addresses.

25 Claims, 8 Drawing Sheets

Track Table 205

| Timestamp | Reference LBA | Size |
|---|---|---|
| t0 | LBA*x* | s0 |
| t1 | LBA*y* | s1 |
| t2 | LBA*z* | s2 |
| ⋮ | ⋮ | ⋮ |
| t*n* | LBA*n* | s*n* |

Session Table 21

| Session | Reference LBA | Size |
|---|---|---|
| 0 | LBA*x* | s0 |
| 1 | LBA*y* | s1 |
| 2 | - | - |
| ⋮ | ⋮ | ⋮ |
| *N* | LBA*N* | s*N* |

⟶

200

GENERATING AND USING SESSION TABLES FOR SESSION-BASED MEMORY MANAGEMENT

FIELD OF TECHNOLOGY

The following relates generally to one or more systems for memory and more specifically to session-based memory operation.

BACKGROUND

Memory systems, such as those including memory devices, are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may receive logical addresses from a host system and translate those logical addresses to physical addresses associated with memory cells of a memory device within the memory system. For example, a memory system may receive a command, such as an access command, that targets one or more logical block addresses (LBAs) and translate those LBAs into physical block addresses (PBAs) that can be used to locate the memory cells for the access operation indicated by the access command. To perform logical address translation the memory system may use a logical-to-physical (L2P) block address table, or "L2P table," that maps LBAs to corresponding PBAs. The memory system may store multiple L2P tables (e.g., in long-term memory) and selectively load one or more of the L2P tables into a cache (e.g., for faster access) when an associated access command is received. But waiting for an associated access command before loading an L2P table into the cache may, among other disadvantages, increase address translation latency, which in turn may negatively impact system performance.

According to the techniques described herein, a memory system may reduce address translation latency by using one or more session tables to predictively load L2P tables into a cache before receipt of one or more associated access commands. In a first example, a session table may define sets of numerically sequential LBAs that may be (e.g., are likely to be) accessed in-order by the host device. In a second example, a session table may define a set of likely-to-be-accessed LBAs and also provide the PBAs corresponding to those LBAs (e.g., the session table may be an L2P session table). As used herein, a set may include one or more elements in the set unless otherwise specified to include two or more elements in the set.

Features of the disclosure are initially described in the context of systems and devices as described with reference to FIG. 1. Features of the disclosure are described in the context of tables and process flows as described with reference to FIGS. 2-7. These and other features of the disclosure are further illustrated by and described with reference to an apparatus diagram and flowcharts that relate to session-based memory operation as described with reference to FIGS. 8-10.

Figure 1:
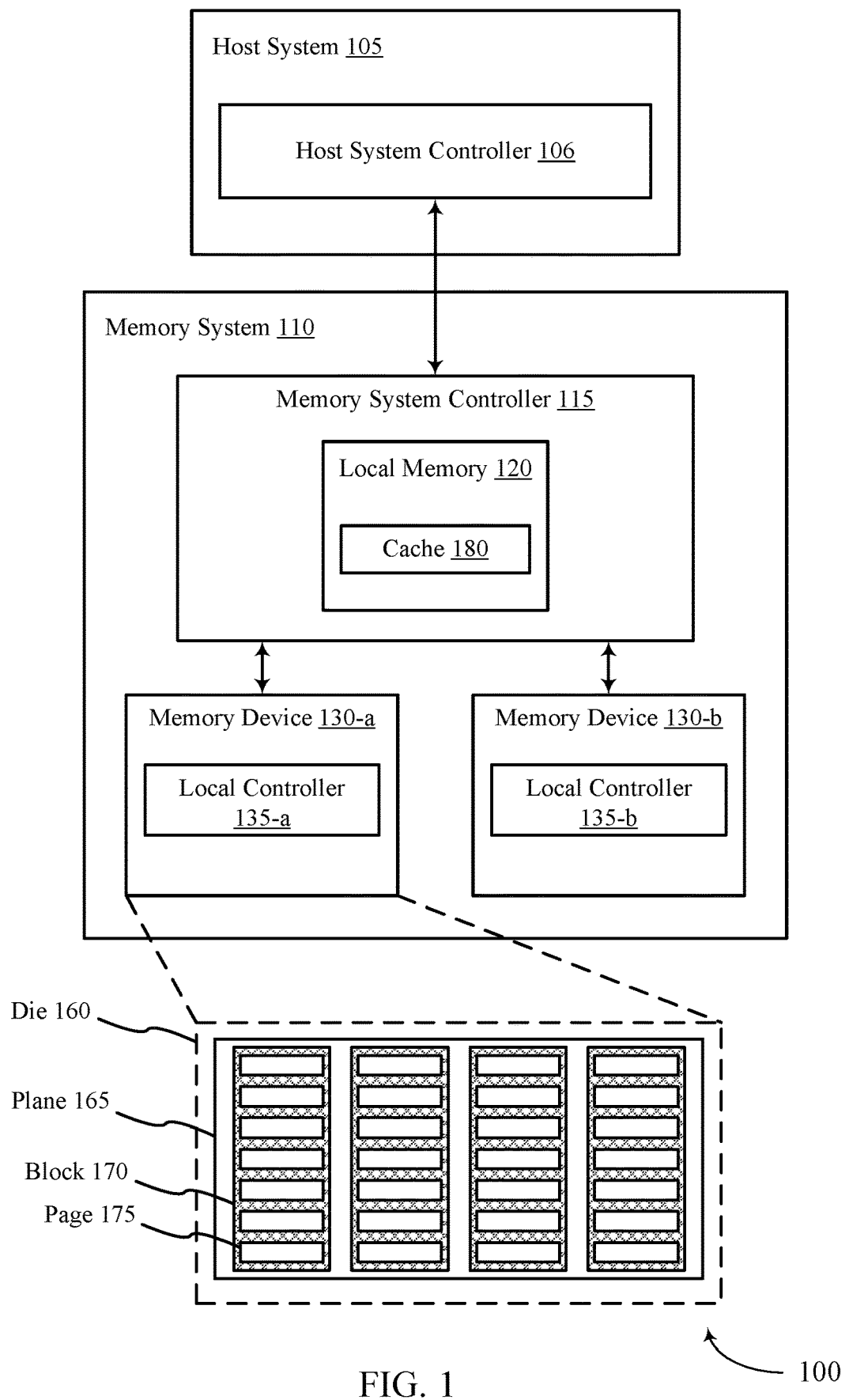
FIG. 1 illustrates an example of a system that supports session-based memory operation in accordance with examples as disclosed herein.

FIG. 1 is an example of a system 100 that supports session-based memory operation in accordance with examples as disclosed herein. The system 100 includes a host system 105 coupled with a memory system 110, which may also be referred to as a memory device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a dual in-line memory module (DIMM) interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, it is to be understood that memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, information may be stored in the local memory 120 when read from or written to a memory device 130 and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support session-based memory operation. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, e.g., one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support session-based memory operations. For example, the host system 105, the memory system 110, or a memory device 130 may include or otherwise may access one or more non-transitory computer readable media storing instructions (e.g., firmware) for performing the functions ascribed herein to the host system 105, the memory system 110, or a memory device 130. For example, such instructions, when executed by the host system 105 (e.g., by the host system controller 106), by the memory system 110 (e.g., by the memory system controller 115), or by a memory device 130 (e.g., by a local controller 135), may cause the host system 105, the memory system 110, or the memory device 130 to perform associated functions as described herein.

To access information in a memory device 130, the host system 105 may communicate one or more access commands to the memory system 110 for execution. The host system 105 may use a set of logical addresses for the access commands, while the memory system 110 may use a set of physical addresses to execute the access commands. For example, the host system 105 may use logical block addresses (LBAs) whereas the memory system may use physical block addresses (PBAs). Each logical block address and each physical block address may be associated with a same granularity of data, such as 4 kB, and there may be multiple physical block addresses per page 175. Thus, a physical block address may refer to a location of a set of memory cells within a page 175 and should not be confused with an address of a block 170.

The memory system 110 may translate logical addresses to physical addresses to appropriately execute access commands from the host system 105. To perform address translation, the memory system 110 may use logical-to-physical (L2P) tables, each of which may indicate a set of logical addresses and their corresponding physical block addresses. In some examples, the logical addresses in the L2P tables may be numerically sequential (e.g., each L2P table may provide the physical address mapping for a set of numerically sequential logical addresses).

The L2P tables used by the memory system 110 may be stored in one or more of the memory devices 130 (e.g., due to the size of the L2P tables). To avoid accessing a memory device 130 each time the memory system 110 uses an L2P table for address translation, the memory system 110 may move the L2P table from the memory device 130 to another location such as a cache memory, such as cache 180, which may have a faster access time than the memory in the memory device 130.

If the memory system 110 receives an access command that targets a logical address of an L2P table in the cache 180, a cache hit is said to occur and the memory system 110 can use the L2P table in the cache 180 to perform address translation. If the memory system 110 receives an access command that targets a logical address of an L2P table that is not in the cache 180, a cache miss is said to occur and the memory system 110 may retrieve the L2P table from a memory device 130 and load the L2P table into the cache 180 before address translation can occur. Because retrieving an L2P table from a memory device 130 takes more time than accessing an L2P table already in the cache 180, increasing the cache hit rate may improve the latency of the system 100.

According to the techniques described herein, the memory system 110 may increase the cache hit rate—and therefore improve system latency—by loading predicted L2P tables into the cache 180 before receipt of one or more associated access commands (e.g., access commands that target logical addresses in the L2P tables). The memory system 110 may predict the L2P tables using a session table that indicates a set of logical addresses that are likely to be accessed in-order based on the manner in which the logical addresses were previously written (e.g., based on a write pattern).

Figure 2:
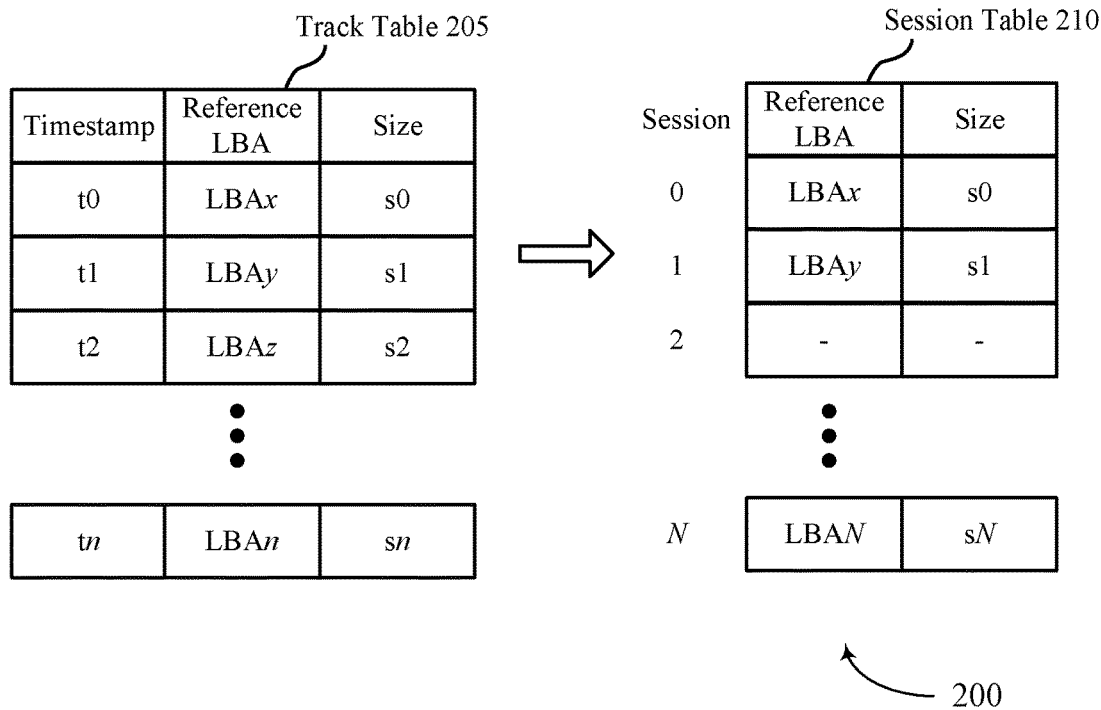
FIG. 2 illustrates an example of tables that support session-based memory operation in accordance with examples as disclosed herein.

FIG. 2 illustrates an example of tables 200 that support session-based memory operation in accordance with examples as disclosed herein. The tables 200 may be maintained by a memory system such as the memory system 110 and may include a track table 205 and a session table 210. The track table 205 may be used to monitor one or more commands, such as access commands (e.g., write commands), received from a host system and to populate the session table 210. The session table 210 may indicate logical addresses written during different sessions and may be used by the memory system to predictively load L2P tables into a cache for one or more read operations. By predictively loading L2P tables the memory system may, among other advantages, reduce the latency of address translation and thus improve system performance.

Among other scenarios, the use of session table 210 may be useful when the data from a file spans logical addresses in multiple L2P tables. Rather than waiting for read commands that respectively target logical addresses in the L2P tables, the memory system may load the L2P tables into the cache upon receipt of a first read command that targets a logical address of a session entry in the session table 210. Thus, the session table 210 may be used to anticipatorily load L2P tables for logical addresses before read commands targeting those addresses are received. The use of a session table 210 during a read operation is described herein and in greater detail with reference to FIG. 3. The construction of a session table 210 using a track table 205 is described herein and in greater detail with reference to FIG. 4. A table may also be referred to as an array or other suitable terminology.

The session table 210 may include entries for multiple sessions (e.g., session 0 through session n), with one entry per session. Each entry for session table 210 may have a reference LBA field and a size field that collectively indicate a set of numerically sequential logical addresses included in (or "covered by") that session. Put another way, the reference LBA (or "starting LBA") may be the LBA from which the rest of the LBAs in the session are derived. For example, if each LBA is associated with a common granularity of data, such as 4 kB, the range of the LBAs in a given session (or "covered" by a session) may be determined by the reference LBA and the size of the data associated with the session (as given by the size field). As an illustration, if session 0 has a reference LBA of LBA0 and a size s0 of 40 kB, the range of LBAs in session 0 may be determined to be LBA0 through LBA9. Of course, other granularities for LBAs and PBAs are contemplated.

As noted, the track table 205 (as one example of a way to organize this tracking information) may be used to track access commands (e.g., write commands) received from a host system and to populate the session table 210. Accordingly, the track table 205 may be updated at a given cadence, such as each time the memory system receives a write command, as described in further detail with respect to FIG. 4.

The track table 205 may allow the memory system to selectively build sessions that are sizable enough to have a meaningful impact on latency. Thus, the track table 205 may include an entry for each potential session or ongoing session and may be organized similarly to session table 210. For example, the reference LBA and the size of data associated with a potential or ongoing session (as given by the reference LBA field and the size field, respectively) may indicate a set of numerically sequential logical addresses implicated in the potential or ongoing session. In addition, each tracking entry may have an associated timestamp (e.g., given by the timestamp field), which may be used to determine when to stop tracking a session. When the size of a tracking entry (e.g., the size of a potential or ongoing session) satisfies a threshold size, the memory system may use the information in the track table 205 to create a new session or update an existing session in the session table 210.

Thus, the track table 205 may be used to maintain the session table 210, which in turn may be used by the memory system to predictively load L2P tables into the cache during a read operation, thereby increasing the cache hit rate and reducing system latency.

Figure 3:
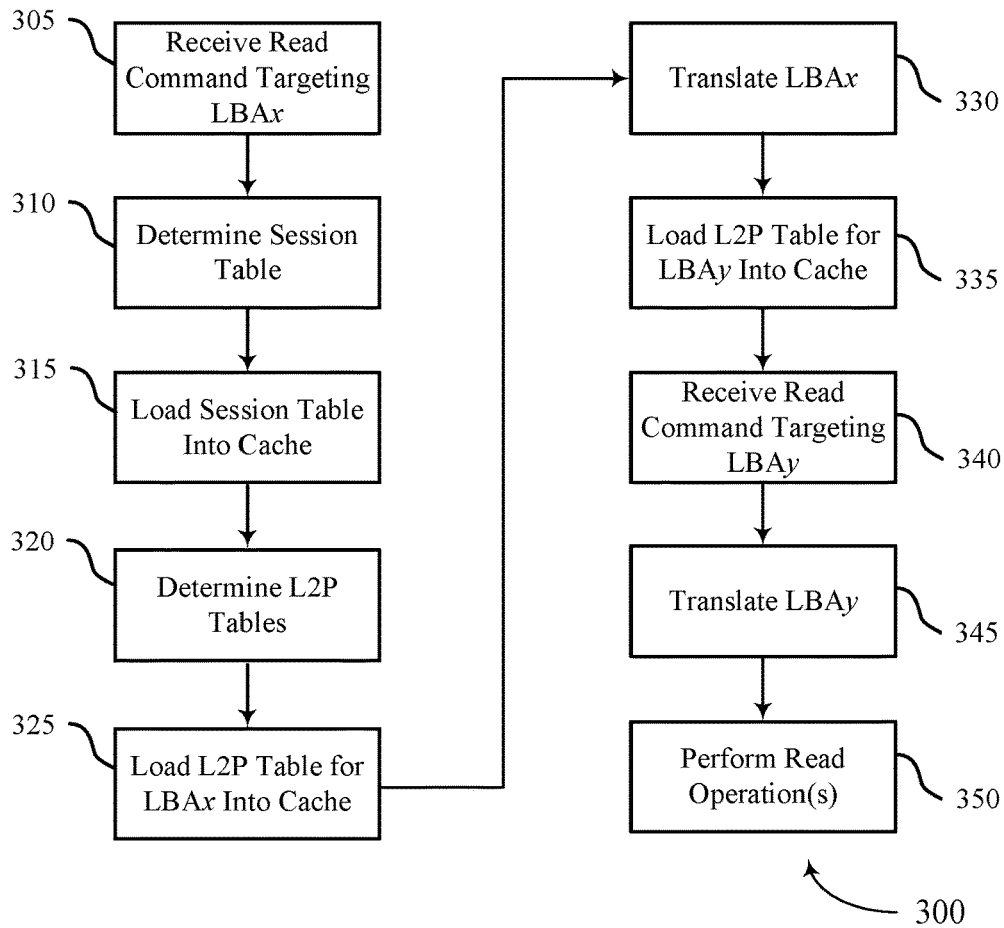
FIG. 3 illustrates an example of a process flow that supports session-based memory operation in accordance with examples as disclosed herein.

FIG. 3 illustrates an example of a process flow 300 that supports session-based memory operation in accordance with examples as disclosed herein. The process flow 300 may be implemented by a memory system such as the memory system 110 described with reference to FIG. 1. The memory system may implement the process flow 300 so that the memory system can use a session table, such as session table 210 described with reference to FIG. 2, to predictively load one or more L2P tables, for example, into a cache during a read operation. Aspects of the process flow 300 may be implemented by a controller, among other components. Additionally or alternatively, aspects of the process flow 300 may be implemented as instructions stored in memory (e.g., firmware stored in a memory coupled with the memory system 110). For example, the instructions, when executed by a controller (e.g., the memory system controller 115), may cause the controller to perform the operations of the process flow 300. Although the description related to FIG. 3 focuses on a read command and related aspects, other alternative implementations also fall within the scope of this description and the present disclosure.

At 305, a first read command that targets a first logical address may be received. For example, the memory system may receive a read command that targets (e.g., indicates, is associated with) logical block address x ("LBAx"). In some examples, the logical address may be one of multiple logical addresses targeted by the first read command (e.g., the read command may indicate a set of numerically sequential logical addresses given by a reference logical address and a size of data).

At 310, a session table associated with the logical address may be determined. For example, the memory system may determine a session table that includes a session associated with LBAx. The memory system may determine the session table based on LBAx being included in the range of logical addresses covered by a session in the session table. At 315, the session table may be retrieved from memory and loaded into (e.g., transferred to, written to, stored in) the cache. For example, the memory system may retrieve (e.g., read, fetch, obtain) the session table associated with LBAx and load the session table into the cache. The session associated with LBAx may cover a range of logical address that includes logical block address y ("LBAy").

At 320, the L2P tables associated with the logical addresses covered by the session may be determined based on loading the session table into the cache. For example, the memory system may determine the L2P tables associated with the logical addresses covered by the session associated with LBAx.

At 325, the L2P table associated with LBAx may be loaded into the cache. For example, the memory system may retrieve the L2P table from memory and load the L2P table into the cache. Loading information, such as an L2P table, into a memory, such as a cache, may refer to writing, storing, or otherwise placing the information in the memory. The cache may also be referred to as a memory, cache memory, temporary memory, local memory, buffer, or other suitable terminology. In some examples, the cache is an SRAM cache. In some examples, the cache includes SLCs.

At 330, address translation may be performed on LBAx. For example, the memory system may use the L2P table for LBAx (which is in the cache) to determine the physical block address associated with LBAx.

At 335, the L2P table associated with LBAy (which was determined at 320) may be loaded into the cache based on LBAy being included in the same session as LBAx. For example, the memory system may retrieve the L2P table associated with LBAy from memory and load the L2P table into the cache. Although described as being loaded at different times—which may occur when the cache is limited to storing a single L2P table at a time—the L2P tables for LBAx and LBAy may in some examples be loaded in a manner such that both L2P tables are in the cache at the same time or for overlapping periods of time. For example, the L2P table for LBAy may also be loaded into the cache at 325 (instead of at 335) or loaded in a manner such that the L2P tables for LBAx and LBAy co-exist in the cache for a duration of time.

At 340, a second read command that targets a second logical address may be received. For example, the memory system may receive a read command that targets LBAy, which may be associated with a different L2P table than LBAx. Because the L2P table for LBAy is ready in the cache when the read command for LBAy is received, LBAy may be translated without the delay associated with retrieving the L2P table for LBAy from memory.

At 345, address translation may be performed on LBAy. For example, the memory system may use the L2P table for LBAy to determine the physical block address associated with LBAy. After the physical block addresses are determined for LBAx and LBAy, one or more read operations may be performed at 350. For example, the memory system may perform one or more read operations using the physical block addresses in accordance with the first and second read commands.

Thus, the process flow 300 may support the use of a session table to predictively load one or more L2P tables, for example into a cache, during a read operation, which may reduce system latency. Alternative examples of the process flow 300 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

In some examples, the memory system may implement tag-along technique for loading session tables into the into the cache. For example, the memory system may associate a first session table with a second table so that when the first session table is loaded into the cache, the second table is also loaded into the cache (e.g., at the same time as the first table or after the first table). The association between session tables may be based on a read pattern for the session tables. For example, the memory system may associate the first session table with the second session table if the memory system determines that the second session table is consistently or frequently accessed after the first session table is accessed. By loading multiple session tables at once, or identifying multiple session tables for loading, the memory system may further increase the cache hit rate and, accordingly, reduce system latency.

In some examples, the memory system may implement a fast-read technique for certain session tables. For example, the memory system may identify frequently accessed session tables (e.g., session tables associated with frequently read data) and store these frequently access session tables into low-latency memories. For instance, the memory system may store frequently accessed session tables in memory that has a lower latency than the memory used to store the rest of the session tables. By doing so, the memory system may further reduce the latency associated with retrieving and loading the frequently accessed session tables, which may further improve address translation latency. Additionally or alternatively, the memory system may load frequently accessed session tables into a cache that has a lower latency than the cache used for the rest of the session tables. By doing so, the memory system may reduce the latency associated with accessing the frequently accessed session tables during a translation operation.

Figure 4:
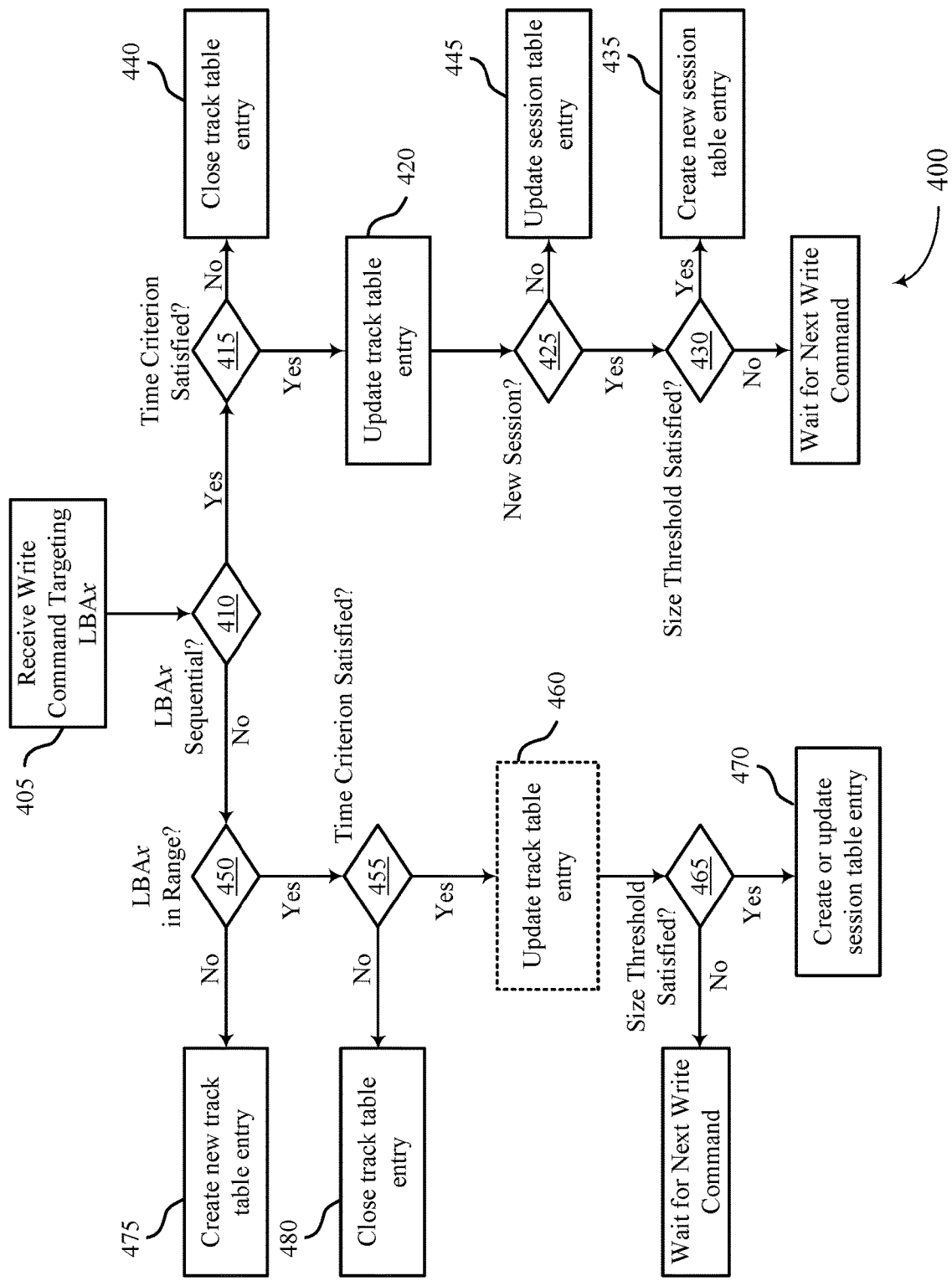
FIG. 4 illustrates an example of a process flow that supports session-based memory operation in accordance with examples as disclosed herein.

FIG. 4 illustrates an example of a process flow 400 that supports session-based memory operation in accordance with examples as disclosed herein. The process flow 400 may be implemented by a memory system such as the memory system 110 described with reference to FIG. 1. The memory system may implement the process flow 400 to build a session table, such as session table 210 described with reference to FIG. 2, which may be used to predictively load one or more L2P tables, for example, into a cache during a read operation, as described with reference to FIG. 3. Aspects of the process flow 400 may be implemented by a controller, among other components. Additionally or alternatively, aspects of the process flow 400 may be implemented as instructions stored in memory (e.g., firmware stored in a memory coupled with the memory system 110). For example, the instructions, when executed by a controller (e.g., the memory system controller 115), may cause the controller to perform the operations of the process flow 400.

The right branch of the process flow 400 may represent actions by the memory system when the starting logical block address for a write command is numerically sequential to a range of logical addresses indicated by (covered by, associated with) a tracking table entry. In general, a track table entry may be updated if a write command for a numerically sequential logical address is received in accordance with a time criterion; and a corresponding session table entry may be updated, for example, if the track table entry satisfies a size threshold.

The left branch of the process flow 400 may represent actions by the memory system when the starting logical block address for a write command is included in the range of logical addresses indicated by a tracking table entry (or not covered by any tracking table entry). In general, a track table entry may be updated if a write command for an in-range logical address is received in accordance with the time criterion and modifies the size of the track table entry; a corresponding session table entry may be updated, for example, if the track table entry satisfies the size threshold.

At 405, a write command targeting a logical address may be received. For example, the memory system may receive a write command that targets logical block address x ("LBAx"). In some examples, the logical address may be the starting address for a set of numerically sequential logical addresses targeted for writing by the write command (e.g., the write command may indicate the starting address LBAx and a size of data, which together indicate a set of LBAs for writing).

At 410, it may be determined whether the logical address is numerically sequential to the numerically last logical block address in any of the entries in a track table, such as track table 205. For example, the memory system 410 may determine whether LBAx is numerically sequential to the numerically last logical block address in any of the entries in the track table. If, at 410, it is determined that LBAx is numerically sequential to the numerically last logical block address in an entry of the track table, the memory system may proceed to 415. If at 410, it is determined that LBAx is not numerically sequential to the numerically last logical block address in an entry of the track table, the memory system may proceed to 450.

At 415, it may be determined whether receipt of the write command satisfies a time criterion (e.g., one or more criteria). For example, the memory system may determine whether the write command was received within a threshold time (e.g., y ms) since the most recent write command associated with the track table entry. The memory system may determine whether the time criterion is satisfied based on a timestamp of the write command received at 405. For example, the memory system may determine whether the time criterion has been satisfied based on a difference between the timestamp of the write command received at 405 and the timestamp of the most recent write command associated with the track table entry. The time criterion may also be referred to using other suitable terminology, such as timing criterion, timing parameter, timing threshold, and the like.

If, at 415, it is determined that receipt of the write command satisfies the time criterion, the memory system may proceed to 420. If at 415, it is determined that receipt of the write command does not satisfy the time criterion, the memory system may proceed to 440 and close the track table entry. Closing a track table entry may involve removing or clearing (e.g., zeroing) the values in the fields of the track table entry.

At 420, the track table entry may be updated. For example, the memory system may update the track table entry based on the time threshold being satisfied. Updating the track table entry may include updating the timestamp field of the track table entry to reflect the timestamp of the write command received at 405. Updating the track table entry may also include updating the size field of the track table entry by adding the size of data associated with the write command to the existing value in the size field. For example, if the size field of the track table entry indicates a value of 36 kB and the size of the data associated with the write command is 4 kB, the size field of the track table entry may be updated to indicate 40 kB. As noted, the range of LBAs covered by a track table entry may be indicated by the reference LBA and the size of the data associated with the entry.

In some examples, updating the track table entry may include updating the reference LBA field to reflect the numerically last LBA targeted by the write command (which may be LBAx or another LBA determined based on LBAx and the size of the data associated with the write command). Alternatively, the reference LBA field may remain the same (depending on the direction of calculation for the range of LBAs).

At 425, it may be determined whether the track table entry is associated with an existing session or a new session. For example, the memory system may determine whether LBAx is numerically sequential to the numerically last logical block address of a session in a session table such as session table 210. If LBAx is numerically sequential to the numerically last logical block address of a session in the session table, the memory system may determine that the track table entry is associated with an existing session. If LBAx is not numerically sequential to the numerically last logical block address of a session in the session table, the memory system may determine that the track table entry is associated with a new session.

If at 425, it is determined that the track table entry is associated with an existing session, the memory system may proceed to 445 and update the existing session. Updating the existing session may include updating one or more fields associated with the session entry in the session table. For example, the memory system may update the size field of the session table entry by adding the size of data associated with the write command to the existing value in the size field. In some examples, the memory system may also update the reference LBA field of the session table entry to reflect the numerically last LBA targeted by the write command (which may be LBAx or another LBA determined based on LBAx and the size of the data associated with the write command). Alternatively, the reference LBA field may remain the same (depending on the direction of calculation for the range of LBAs).

If, at 425, it is determined that the track table entry is associated with a new session, the memory system may proceed to 430.

At 430, it may be determined whether the updated size of the track table entry satisfies a size threshold. For example, the memory system may determine whether the size of the track table entry (as given by the size field) is greater than a threshold size, such as 3 MB.

If, at 430, it is determined that the size of the track table entry satisfies the size threshold, the memory system may proceed to 435 and create a new session table entry for a new session. The new session table entry may indicate a reference logical block address for the session and a size of data associated with the session. If, at 430, it is determined that the size of the track table entry does not satisfy the size threshold, the memory system wait for the next write command.

Referring now to the decision at 410, the memory system may, upon determining that LBAx is not numerically sequential to the numerically last logical block address covered by an entry of the track table, proceed to 450.

At 450, it may be determined whether the logical address is within a range of logical addresses covered by the various entries in the track table. For example, the memory system may determine whether LBAx is included in a range of logical block addresses covered by any of the entries in the track table. As an illustration, LBAx may be considered to be included in a range of logical block addresses LBA0 through LBA4 if LBAx is LBA0, LBA1, LBA2, or LBA3.

If, at 450, it is determined that LBAx is not included in the range of an entry in the track table, the memory system may proceed to 475 and create a new track table entry that covers LBAx.

If, at 450, it is determined that LBAx is included in the range of an entry in the track table, the memory system may proceed to 455. At 455, it may be determined whether receipt of the write command satisfies the time criterion. For example, the memory system may determine whether the write command was received within y ms of the most recent write command associated with the track table entry. The memory system may determine whether the time criterion is satisfied based on a timestamp of the write command received at 405. For example, the memory system may determine whether the time criterion is satisfied based on a difference between the timestamp of the write command received at 405 and the timestamp of the most recent write command associated with the track table entry.

If at 455, it is determined that receipt of the write command does not satisfy the time threshold, the memory system may proceed to 480 and close the track table entry that covers LBAx.

If, at 455, it is determined that receipt of the write command satisfies the time criterion, the memory system may proceed to 460. At 460, the track table entry with the range of logical addresses that includes LBAx may be updated based on the time criterion being satisfied. For example, the memory system may update the timestamp field for the track table entry to reflect the timestamp of the write command received at 405. In some cases, the memory system may also update the size field for the track table entry. For example, if the size of data associated with the write command for LBAx indicates a set of one or more logical addresses that overlap with, and extend beyond, the numerically last logical address of the track table entry, the memory system may update the track table entry to reflect a new range of logical address that includes the original range plus the set of one or more logical addresses. The memory system may update the track table entry by updating the size field so that the size field and the reference LBA collectively indicate the new range of logical addresses. As an illustration, if the track table entry has an original range of LBA0 through LBA4, LBAx is LAB2, and the size of data associated with the write command indicates LBA2 through LBA7, the size field of the track table entry may be updated (e.g., from 20 kB to 32 kB) to indicate LBA0 through LBA7.

At 465, it may be determined whether the size of the track table entry satisfies a size threshold. For example, the memory system may determine whether the size of the track table entry (as given by the size field) is greater than the threshold size (e.g., 3 MB).

If, at 465, it is determined that the size of the track table entry does not satisfy the size threshold, the memory system may wait for the next write command.

If, at 465, it is determined that the size of the track table entry satisfies the size threshold, the memory system may proceed to 470 and create a new session table entry for a new session or update an existing session associated with the track table entry. Creating a new session table entry may include populating the size field and the reference LBA field associated with values associated with that entry. Updating an existing session table entry may include updating the values of the size field and/or reference LBA field for the existing session table entry.

Thus, the memory system may implement the process flow 400 to build a session table that can be used to predictively load one or more L2P tables, for example, into a cache during a read operation. Alternative examples of the process flow 400 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 5:
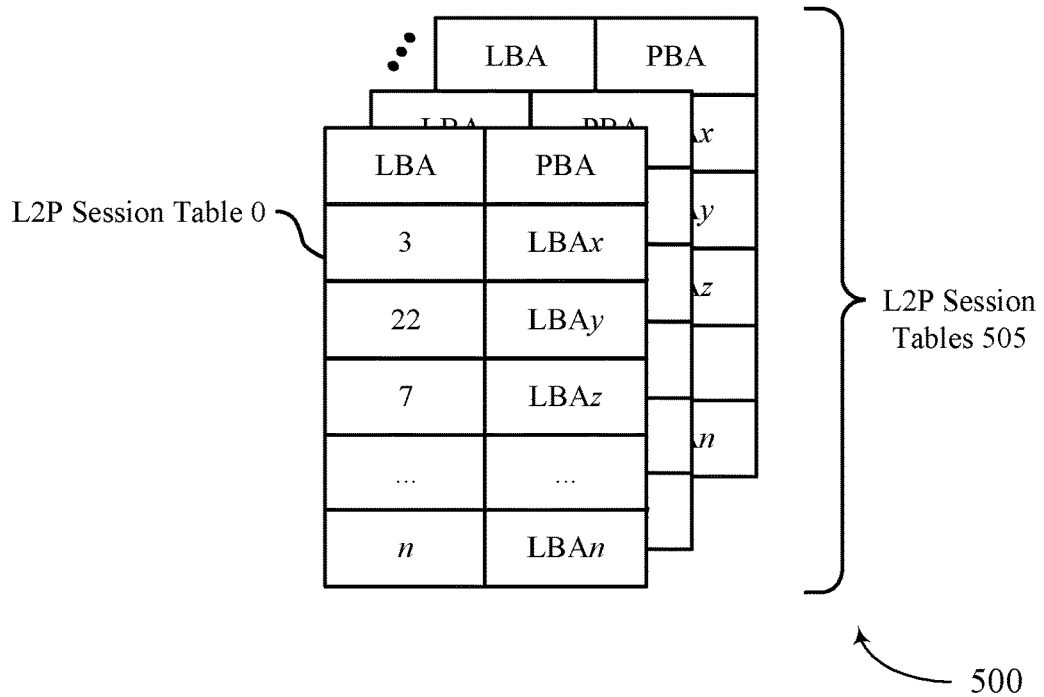
FIG. 5 illustrates an example of tables that support session-based memory operation in accordance with examples as disclosed herein.

FIG. 5 illustrates an example of tables 500 that supports session-based memory operation in accordance with examples as disclosed herein. The tables 500 may be maintained by a memory system such as the memory system 110 and may include multiple L2P session tables 505. The L2P session tables 505 may be used by the memory system instead of L2P tables and may allow the memory system to load an L2P session table into a cache for translation of logical addresses that are non-sequential, which may improve system performance. In some examples, the table 500 may include one or more no-session L2P tables, as described with greater detail with respect to FIG. 7.

The L2P session tables 505 may be organized differently than other L2P tables (e.g., those described with reference to FIGS. 1 through 4). For example, rather than provide the physical block addresses for a set of numerically sequential physical block addresses, each L2P session table 505 may provide the physical block addresses for a set of physical block addresses that are in a same session. Thus, the logical block addresses included in an L2P session table may be sequential or non-sequential. For example, L2P session table 0 may indicate the physical block addresses for LBA3, LBA22, and LBA7, among others. Like other L2P tables, the L2P session tables 505 may be stored in memory as described herein and loaded into a cache for address translation during a read operation.

Among other scenarios, the use of session tables 505 may be useful when the data from a file is stored in memory cells associated with non-consecutive logical block addresses. For example, the memory cells storing a first set of data (or first "fragment") for a file may have logical addresses that are non-sequential relative to the logical addresses of memory cells storing a second set of data (or second "fragment") for the file. Rather than waiting for read commands that target the logical addresses for the different fragments, the memory system may load the L2P session table 505 for the file into the cache upon receipt of the first read command that targets a logical address of the L2P session table 505. Because the L2P table has the physical bank addresses for the other logical addresses in the session, the memory system can perform address translation for the file without loading additional L2P tables, thereby conserving resources and reducing latency.

Figure 6:
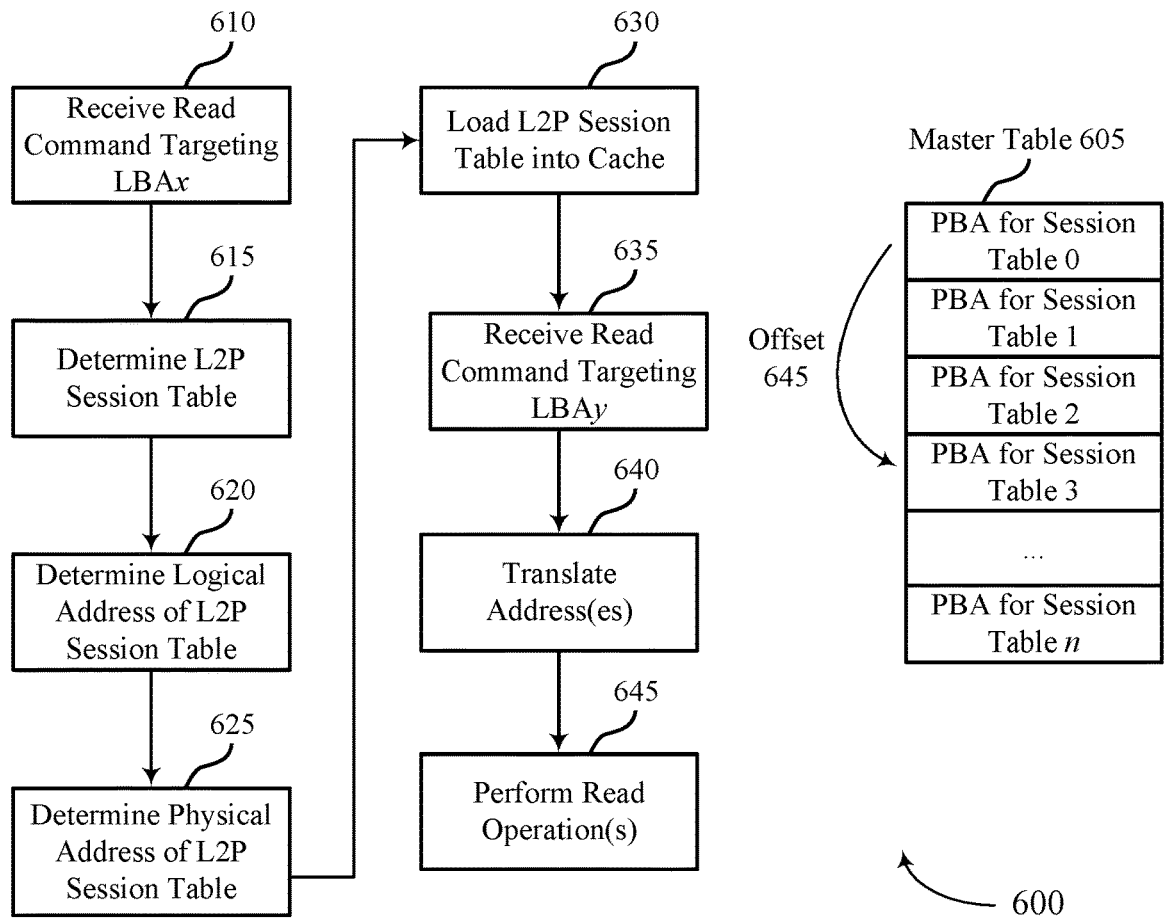
FIG. 6 illustrates an example of a process flow that supports session-based memory operation in accordance with examples as disclosed herein.

The use of an L2P session table 505 during a read operation is described herein and in greater detail with reference to FIG. 6. The construction of an L2P session table 505 is described herein and in greater detail with reference to FIG. 7.

FIG. 6 illustrates an example of a process flow 600 and a master table 605 that support session-based memory operation in accordance with examples as disclosed herein. The process flow 600 may be implemented by a memory system such as the memory system 110 described with reference to FIG. 1. The memory system may implement the process flow 600 so that the memory system can use an L2P session table, such as an L2P session table 505 described with reference to FIG. 5, to efficiently perform address translation during a read operation. Aspects of the process flow 600 may be implemented by a controller, among other components. Additionally or alternatively, aspects of the process flow 600 may be implemented as instructions stored in memory (e.g., firmware stored in a memory coupled with the memory system 110). For example, the instructions, when executed by a controller (e.g., the memory system controller 115), may cause the controller to perform the operations of the process flow 600. Although the description related to FIG. 6 focuses on a read command and related aspects, other alternative implementations also fall within the scope of this description and the present disclosure.

At 610, a first read command that targets a first logical address may be received. For example, the memory system may receive a read command that targets logical block address x ("LBAx"). At 615, an L2P session table associated with the logical address may be determined. For example, the memory system may determine an L2P session table associated with LBAx. For example, the memory system may determine that L2P session table 3 is associated with LBAx. The memory system may determine the session table based on LBAx being associated with an identifier (ID) of the session table. In some examples, the ID of the session table is derived from the range of logical block addresses covered by the session table. For instance, the ID of the session table may be derived from the range of logical block addresses using a hash function.

At 620, the logical address of the L2P session table may be determined. For example the memory system may determine the logical address for L2P session table 3. At 625, the physical address for the L2P session table may be determined based on the logical address of the L2P session table. For example, the memory system may determine the physical address of L2P session table 3. The memory system may determine the physical address from master table 605, which may contain the physical addresses of L2P session tables. The physical addresses may be arranged so that the logical addresses associated with the physical addresses sequentially increase (numerically, index-wise) starting from the physical address for L2P session table 0. So, to determine the physical address for an L2P session table, the memory system may use an offset that indicates the appropriate entry of the master table 605. For example, to determine the physical address for L2P session table 3, the memory system may use offset 645, which may be equal to three, to reference the fourth entry of master table 605, which may contain the physical address for L2P session table 3.

At 630, the L2P session table may be loaded into the cache for the memory system. For example, the memory system may load L2P session table 3 into the cache. The memory system may locate the L2P session table in memory based on the physical address determined at 625. At 635, a second read command that targets a second logical address may be received. For example, the memory system may receive a read command that targets logical block address y ("LBAy"). The L2P session table (e.g., L2P session table 0) may include the physical addresses for LBAx and LBAy, among others. Thus, the memory system may be ready to translate LBAy even before receipt of the write command targeting LBAy.

In some examples, the host system may request read operations for two different concurrent activities (e.g., read commands for one activity may be interleaved with read commands for another activity). In such a scenario, the memory system may load multiple L2P sessions (e.g., one L2P session per activity) in the cache. For example, in addition to loading L2P session table 0 into the cache the memory system may also load L2P session table 10 into the cache, where L2P session table 0 and L2P session table 10 are associated with different activities.

At 640, address translation may be performed for LBAx and LBAy. For example, the memory system may use L2P session table 0 to determine the physical block addresses associated with LBAx and LBAy, respectively. After the physical block addresses are determined, one or more read operations may be performed at 645. For example, the memory system may perform one or more read operations using the physical block addresses in accordance with the first and second read commands.

Thus, the process flow 600 may support the use of an L2P session table to efficiently perform address translation during a read operation. Alternative examples of the process flow 600 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 7:
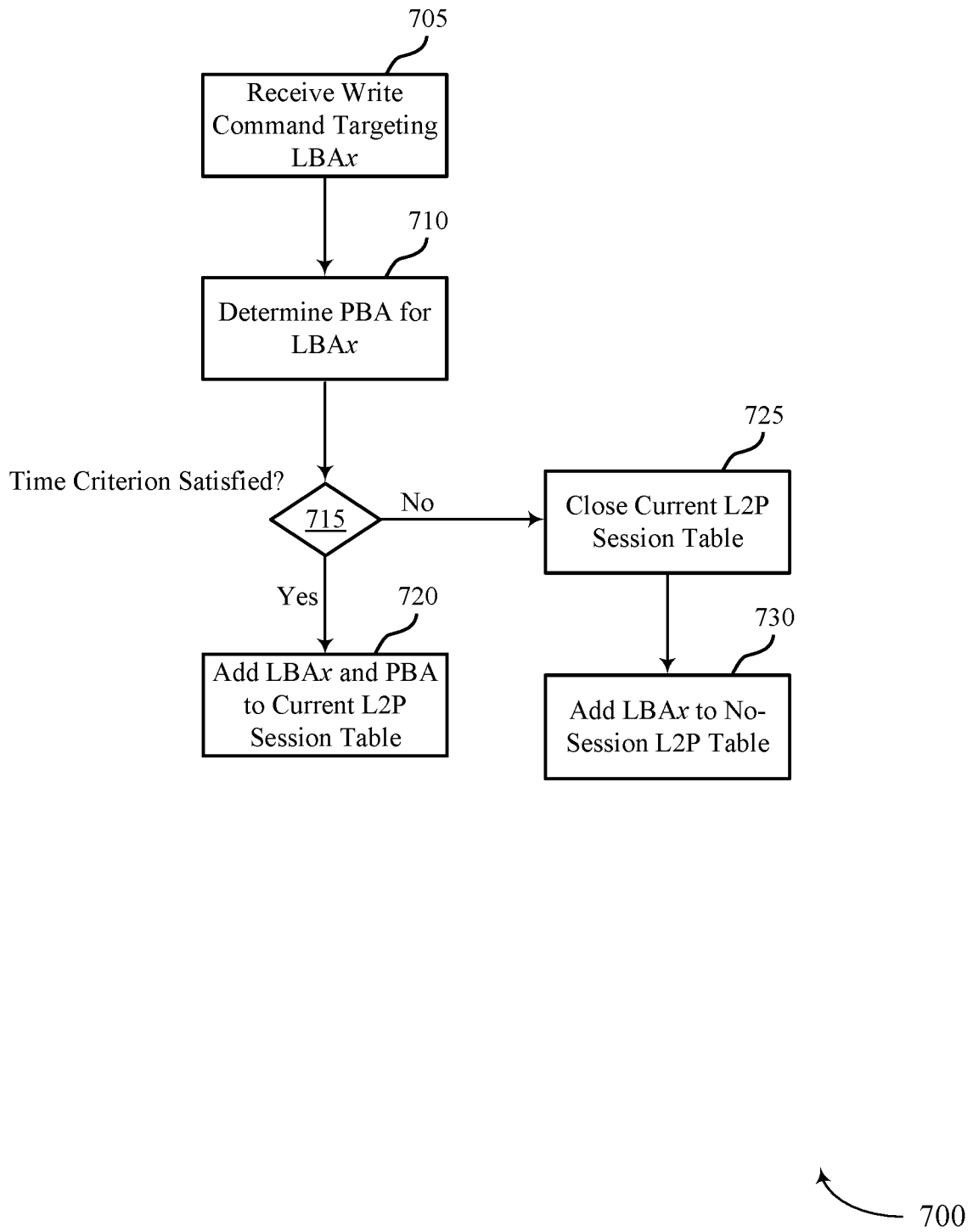
FIG. 7 illustrates an example of a process flow that supports session-based memory operation in accordance with examples as disclosed herein.

FIG. 7 illustrates an example of a process flow 700 that supports session-based memory operation in accordance with examples as disclosed herein. The process flow 700 may be implemented by a memory system such as the memory system 110 described with reference to FIG. 1. The memory system may implement the process flow 700 to build an L2P session table, such as an L2P session table 505 described with reference to FIG. 5, which may be used to efficiently perform address translation during a read operation, as described with reference to FIG. 6. Aspects of the process flow 700 may be implemented by a controller, among other components. Additionally or alternatively, aspects of the process flow 700 may be implemented as instructions stored in memory (e.g., firmware stored in a memory coupled with the memory system 110). For example, the instructions, when executed by a controller (e.g., the memory system controller 115), may cause the controller to perform the operations of the process flow 700.

At 705, a write command targeting a logical address may be received. For example, the memory system may receive a write command that targets logical block address x ("LBAx"). At 710, the physical address associated with the logical address may be determined. For example, the memory system may determine the logical address associated with LBAx.

At 715, it may be determined whether receipt of the write command satisfies a time criterion. For example, the memory system may determine whether the write command was received within a threshold duration of time (e.g., y ms) since the most recent write command associated with an L2P session table. The memory system may determine whether the time criterion is satisfied based on a timestamp of the write command received at 705. For example, the memory system may determine whether the time criterion has been satisfied based on a difference between the timestamp of the write command received at 705 and the timestamp of the most recent write command associated with the L2P session table.

If, at 715, it is determined that receipt of the write command satisfies the time criterion, the memory system may proceed to 720. At 720, the physical address and the logical address may be added to the current L2P session table based on the time criterion being satisfied. For example, the memory system may update L2P session table 0 to include LBAx and the physical address associated with LBAx.

If at 715, it is determined that receipt of the write command does not satisfy the time criterion, the memory system may proceed to 725. At 725, the current L2P session table may be closed based on the time criterion not being satisfied. Closing an L2P session table may include storing the L2P session table in memory. At 730, the logical address may be added to a no-session L2P table or a new L2P session table may be started. A no-session L2P table may include the physical address mappings for logical addresses that are unassociated with a session (e.g., logical addresses whose write commands are not received in accordance with the time criterion). So, the memory system may add LBAx and its corresponding physical block address to the no-session L2P table. If another (e.g., second) write command is received in accordance with the time criterion, the memory system may start a new L2P session table that includes LBAx and the logical address(es) targeted by the second write command.

Due to the time criterion, host activity (e.g., video encoding) or files may be split among different L2P session tables. For example, a first data fragment of a file may be associated with a first L2P session table and a second data fragment of the file may be associated with a second L2P session table. The memory system may compensate for fragmented files using the tag-along technique described herein (e.g., the memory system may tag associated L2P session tables for loading into the cache).

Thus, the memory system may implement the process flow 700 to build L2P session tables that can be used to efficiently perform address translation during a read operation. Alternative examples of the process flow 700 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

In some examples, the memory system may build the L2P session tables based on session information from the host system (as opposed to a time criterion basis). For example, the host system may indicate to the memory system when a session begins and when a session stops.

Figure 8:
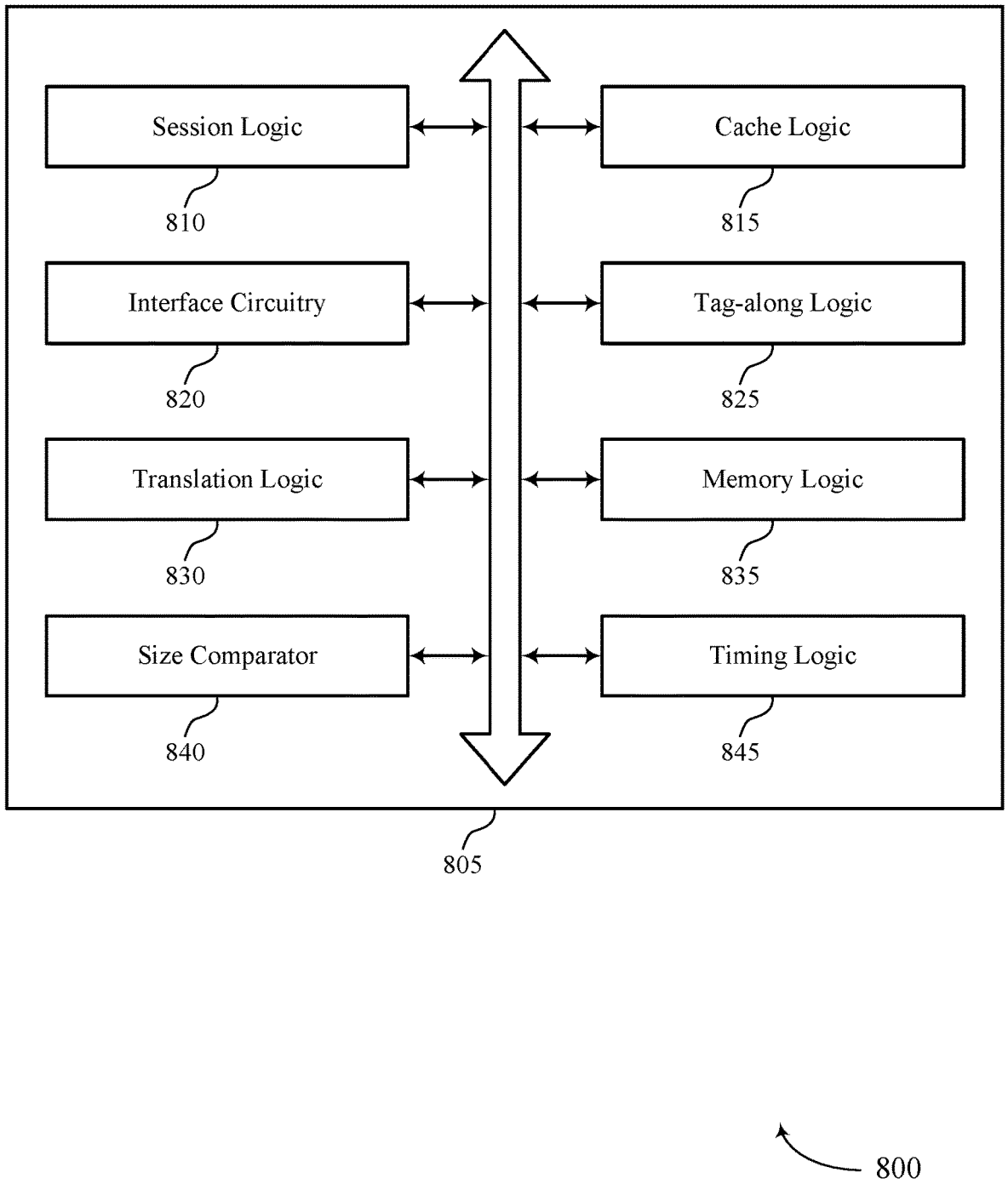
FIG. 8 shows a block diagram of a memory system that supports session-based memory operation in accordance with aspects of the present disclosure.

FIG. 8 shows a block diagram 800 of a memory system 805 that supports session-based memory operation in accordance with examples as disclosed herein. The memory system 805 may be an example of aspects of a memory system as described with reference to FIGS. 1 through 7. The memory system 805 may include session logic 810, cache logic 815, interface circuitry 820, tag-along logic 825, translation logic 830, memory logic 835, a size comparator 840, and timing logic 845. Each of these modules may communicate, directly or indirectly, with one another (e.g., via one or more buses).

The session logic 810 may determine that a logical block address targeted by a read command is associated with a first table indicating a first set of logical block addresses each previously targeted by one or more write commands whose receipt satisfied a timing criterion. In some cases, the first set of logical block addresses includes numerically sequential logical block addresses. In some examples, the session logic 810 may determine that the logical block address is associated with a table indicating a set of logical block addresses each previously targeted by one or more write commands whose receipt satisfied a timing criterion.

In some examples, the session logic 810 may update the table to indicate that the set of logical block addresses includes the logical block address based on receipt of the write command satisfying the timing criterion relative to a previous write command associated with the set of logical block addresses.

In some examples, the session logic 810 may write one or more values in the first table based on each of the logical block addresses in the first set of logical block addresses being targeted by a write command received within a threshold duration of time relative to a previous write command associated with a numerically sequential logical block address in the first set of logical block addresses.

In some examples, the session logic 810 may update, based on the threshold amount of time expiring, a second table to indicate that the set of logical block addresses includes the logical block address.

In some examples, the session logic 810 may determine that the logical block address is numerically sequential to a last logical block address of the set of logical block addresses indicated by the table.

In some examples, the session logic 810 may determine that the second set of logical block addresses numerically overlaps with the set of logical block addresses.

In some cases, the timing criterion specifies a threshold duration between receipt of a write command that targets a first logical block address and receipt of a second write command that targets a second logical block that is numerically sequential to the first logical block address.

In some cases, the set of logical block addresses includes numerically sequential logical block addresses. In some cases, the table indicates physical block addresses that correspond to the set of logical block addresses.

The cache logic 815 may write, to a cache, the first table based on the logical block address being associated with the first set of logical block addresses.

In some examples, the cache logic 815 may write, to the cache based on the first table, a second table indicating a second set of logical block addresses and corresponding physical block addresses, the second set of logical block addresses including logical block addresses from the first set of logical block addresses indicated by the first table.

In some examples, the cache logic 815 may write, to the cache based on the first table, a third table indicating a third set of logical block addresses and corresponding physical block addresses, the third set of logical block addresses including logical block addresses from the first set of logical block addresses indicated by the first table.

In some examples, the cache logic 815 may write, to the cache, the third table based on determining that the first table is associated with the third table.

In some examples, the cache logic 815 may write the table to a cache of the memory system based on the read command and the logical block address being included in the table.

In some examples, the cache logic 815 may write, to the cache based on the table, a second table indicating a second set of logical block addresses and corresponding physical block addresses, the second set of logical block addresses including logical block addresses from the set of logical block addresses indicated by the table.

The interface circuitry 820 may receive a write command targeting a logical block address.

In some examples, the interface circuitry 820 may receive a second read command for a second logical block address after loading the third table into the cache, the third table indicating a physical block address corresponding to the second logical block address.

In some examples, the interface circuitry 820 may receive a read command targeting the logical block address.

The tag-along logic 825 may determine that the first table is associated with a third table indicating a third set of logical block addresses that were each previously targeted for one or more write operations in accordance with the timing criterion.

The translation logic 830 may determine a physical block address associated with the logical block address based on the second table.

In some examples, the translation logic 830 may determine a physical block address associated with the logical block address based on a mapping provided by the table.

The memory logic 835 may perform a read operation on a set of memory cells associated with the physical block address.

In some examples, the memory logic 835 may perform a read operation on a set of memory cells associated with the physical block address.

The size comparator 840 may determine that the set of logical block addresses is associated with a size of data that satisfies a size threshold, where the table is updated based on the size satisfying the size threshold.

The timing logic 845 may determine that a threshold amount of time has expired since receipt of the write command.

Figure 9:
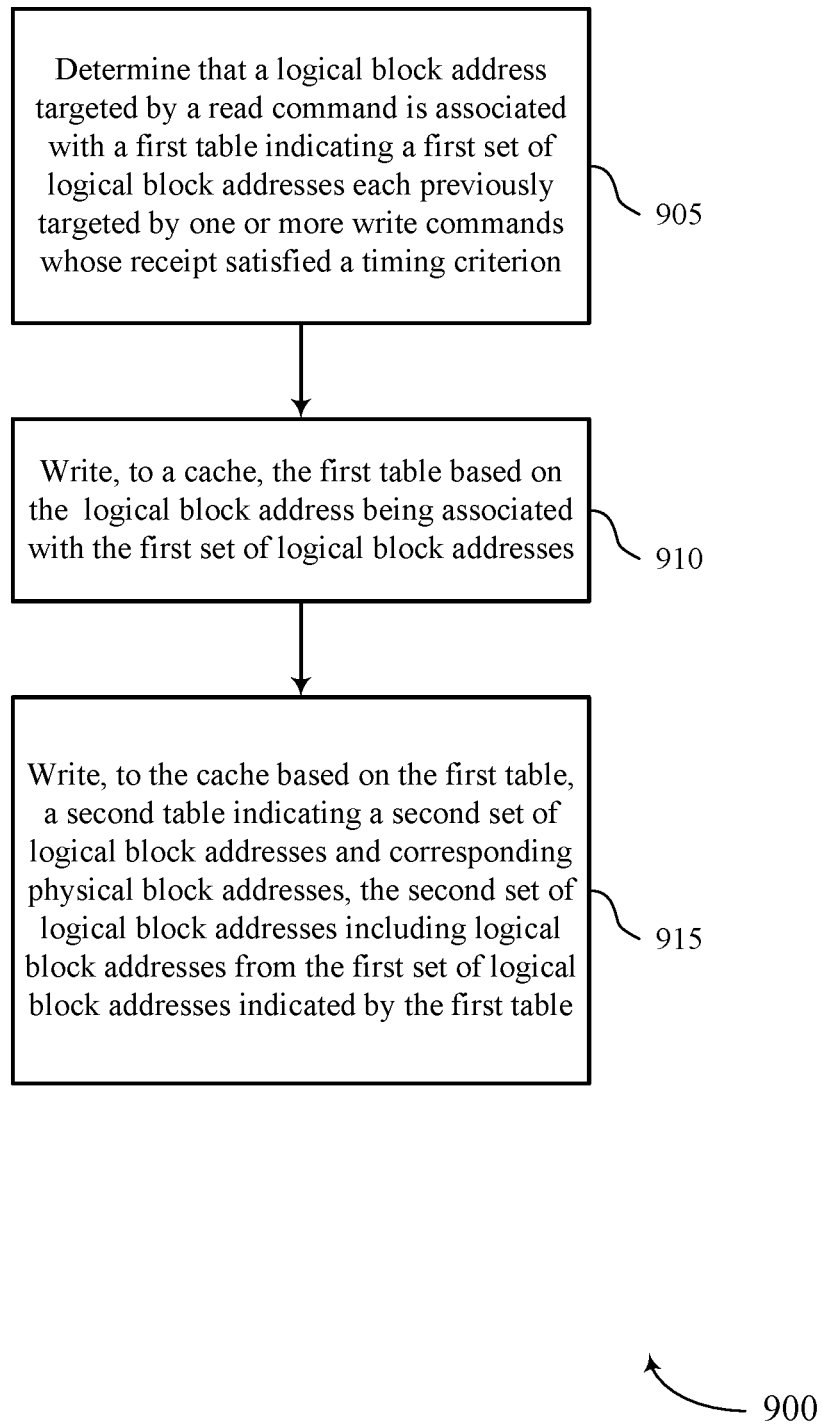
FIGS. 9 and 10 show flowcharts illustrating a method or methods that support session-based memory operation in accordance with examples as disclosed herein.

FIG. 9 shows a flowchart illustrating a method or methods 900 that supports session-based memory operation in accordance with aspects of the present disclosure. The operations of method 900 may be implemented by a memory system or its components as described herein. For example, the operations of method 900 may be performed by a memory system as described with reference to FIG. 8. In some examples, a memory system may execute a set of instructions to control the functional elements of the memory system to perform the described functions. Additionally or alternatively, a memory system may perform aspects of the described functions using special-purpose hardware.

At 905, the method may include determining that a logical block address targeted by a read command is associated with a first table indicating a first set of logical block addresses each previously targeted by one or more write commands whose receipt satisfied a timing criterion. The operations of 905 may be performed according to the methods described herein. In some examples, aspects of the operations of 905 may be performed by a session logic as described with reference to FIG. 8.

At 910, the method may include writing, to a cache, the first table based on the logical block address being associated with the first set of logical block addresses. The operations of 910 may be performed according to the methods described herein. In some examples, aspects of the operations of 910 may be performed by a cache logic as described with reference to FIG. 8.

At 915, the method may include writing, to the cache based on the first table, a second table indicating a second set of logical block addresses and corresponding physical block addresses, the second set of logical block addresses including logical block addresses from the first set of logical block addresses indicated by the first table. The operations of 915 may be performed according to the methods described herein. In some examples, aspects of the operations of 915 may be performed by a cache logic as described with reference to FIG. 8.

In some examples, an apparatus as described herein may perform a method or methods, such as the method 900. The apparatus may include features, means, or instructions (e.g., a non-transitory computer-readable medium storing instructions executable by a processor) for determining that a logical block address targeted by a read command is associated with a first table indicating a first set of logical block addresses each previously targeted by one or more write commands whose receipt satisfied a timing criterion, writing, to a cache, the first table based on the logical block address being associated with the first set of logical block addresses, and writing, to the cache based on the first table, a second table indicating a second set of logical block addresses and corresponding physical block addresses, the second set of logical block addresses including logical block addresses from the first set of logical block addresses indicated by the first table.

In some examples of the method 900 and the apparatus described herein, the first set of logical block addresses includes numerically sequential logical block addresses.

In some examples of the method 900 and the apparatus described herein, the timing criterion specifies a threshold duration between receipt of a write command that targets a first logical block address and receipt of a second write command that targets a second logical block that may be numerically sequential to the first logical block address.

Some examples of the method 900 and the apparatus described herein may further include operations, features, means, or instructions for writing, to the cache based on the first table, a third table indicating a third set of logical block addresses and corresponding physical block addresses, the third set of logical block addresses including logical block addresses from the first set of logical block addresses indicated by the first table.

Some examples of the method 900 and the apparatus described herein may further include operations, features, means, or instructions for receiving a second read command for a second logical block address after loading the third table into the cache, the third table indicating a physical block address corresponding to the second logical block address.

Some examples of the method 900 and the apparatus described herein may further include operations, features, means, or instructions for writing one or more values in the first table based on each of the logical block addresses in the first set of logical block addresses being targeted by a write command received within a threshold duration of time relative to a previous write command associated with a numerically sequential logical block address in the first set of logical block addresses.

Some examples of the method 900 and the apparatus described herein may further include operations, features, means, or instructions for determining that the first table may be associated with a third table indicating a third set of logical block addresses that were each previously targeted for one or more write operations in accordance with the timing criterion, and writing, to the cache, the third table based on determining that the first table may be associated with the third table.

Some examples of the method 900 and the apparatus described herein may further include operations, features, means, or instructions for determining a physical block address associated with the logical block address based on the second table, and performing a read operation on a set of memory cells associated with the physical block address.

Figure 10:
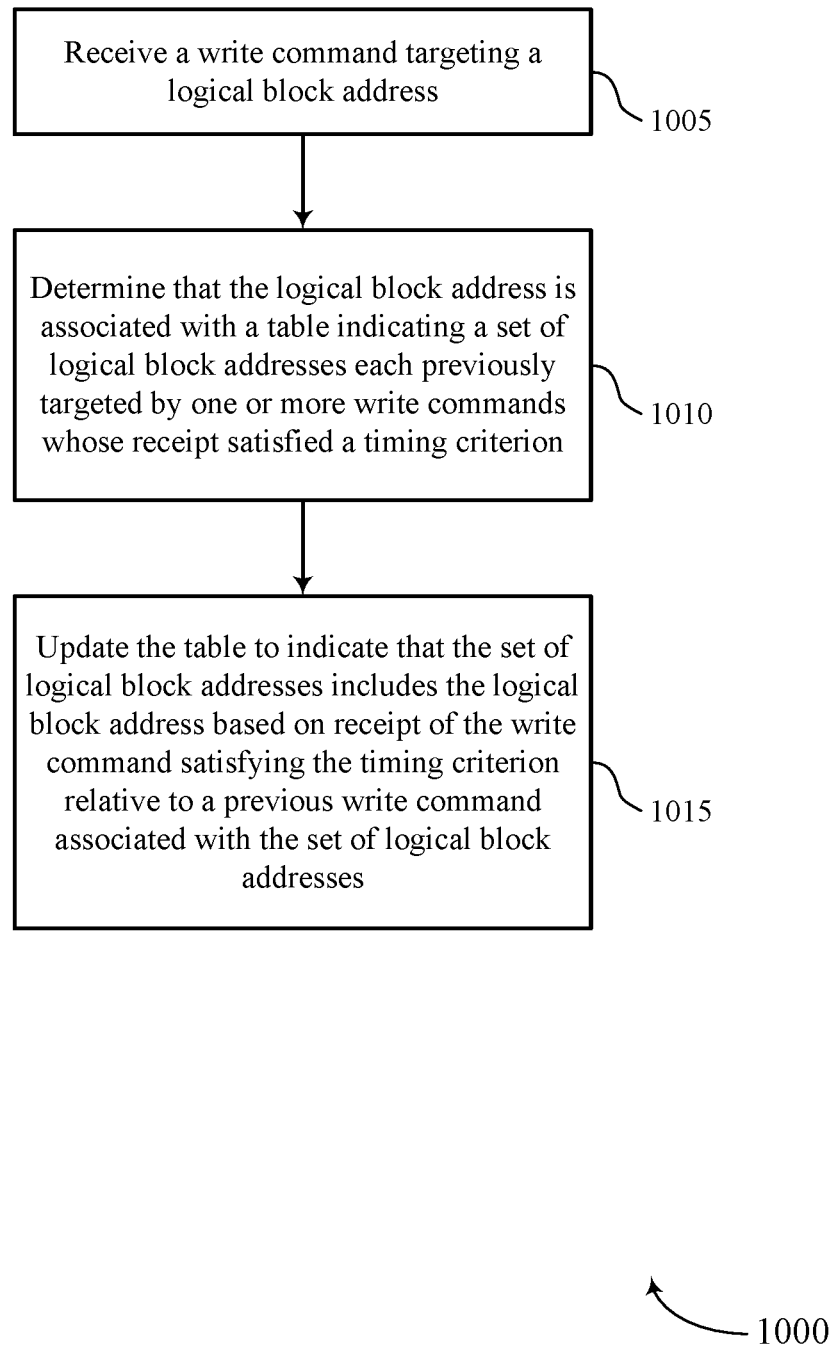

FIG. 10 shows a flowchart illustrating a method or methods 1000 that supports session-based memory operation in accordance with aspects of the present disclosure. The operations of method 1000 may be implemented by a memory system or its components as described herein. For example, the operations of method 1000 may be performed by a memory system as described with reference to FIG. 8. In some examples, a memory system may execute a set of instructions to control the functional elements of the memory system to perform the described functions. Additionally or alternatively, a memory system may perform aspects of the described functions using special-purpose hardware.

At 1005, the method may include receiving a write command targeting a logical block address. The operations of 1005 may be performed according to the methods described herein. In some examples, aspects of the operations of 1005 may be performed by an interface circuitry as described with reference to FIG. 8.

At 1010, the method may include determining that the logical block address is associated with a table indicating a set of logical block addresses each previously targeted by one or more write commands whose receipt satisfied a timing criterion. The operations of 1010 may be performed according to the methods described herein. In some examples, aspects of the operations of 1010 may be performed by a session logic as described with reference to FIG. 8.

At 1015, the method may include updating the table to indicate that the set of logical block addresses includes the logical block address based on receipt of the write command satisfying the timing criterion relative to a previous write command associated with the set of logical block addresses. The operations of 1015 may be performed according to the methods described herein. In some examples, aspects of the operations of 1015 may be performed by a session logic as described with reference to FIG. 8.

In some examples, an apparatus as described herein may perform a method or methods, such as the method 1000. The apparatus may include features, means, or instructions (e.g., a non-transitory computer-readable medium storing instructions executable by a processor) for receiving a write command targeting a logical block address, determining that the logical block address is associated with a table indicating a set of logical block addresses each previously targeted by one or more write commands whose receipt satisfied a timing criterion, and updating the table to indicate that the set of logical block addresses includes the logical block address based on receipt of the write command satisfying the timing criterion relative to a previous write command associated with the set of logical block addresses.

In some examples of the method 1000 and the apparatus described herein, the set of logical block addresses includes numerically sequential logical block addresses.

Some examples of the method 1000 and the apparatus described herein may further include operations, features, means, or instructions for determining that the set of logical block addresses may be associated with a size of data that satisfies a size threshold, where the table may be updated based on the size satisfying the size threshold.

Some examples of the method 1000 and the apparatus described herein may further include operations, features, means, or instructions for determining that a threshold amount of time may have expired since receipt of the write command, and updating, based on the threshold amount of time expiring, a second table to indicate that the set of logical block addresses includes the logical block address.

In some examples of the method 1000 and the apparatus described herein, determining that the logical block address may be associated with the table may include operations, features, means, or instructions for determining that the logical block address may be numerically sequential to a last logical block address of the set of logical block addresses indicated by the table.

In some examples of the method 1000 and the apparatus described herein, the logical block address may be included in a second set of logical block addresses targeted by the write command, and where determining that the logical block address may be associated with the set of logical block addresses may include operations, features, means, or instructions for determining that the second set of logical block addresses numerically overlaps with the set of logical block addresses.

Some examples of the method 1000 and the apparatus described herein may further include operations, features, means, or instructions for receiving a read command targeting the logical block address, and writing the table to a cache of the memory system based on the read command and the logical block address being included in the table.

Some examples of the method 1000 and the apparatus described herein may further include operations, features, means, or instructions for writing, to the cache based on the table, a second table indicating a second set of logical block addresses and corresponding physical block addresses, the second set of logical block addresses including logical block addresses from the set of logical block addresses indicated by the table.

Some examples of the method 1000 and the apparatus described herein may further include operations, features, means, or instructions for determining a physical block address associated with the logical block address based on a mapping provided by the table, and performing a read operation on a set of memory cells associated with the physical block address.

In some examples of the method 1000 and the apparatus described herein, the table indicates physical block addresses that correspond to the set of logical block addresses.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method performed by a memory system, comprising:
    determining that a logical block address targeted by a read command is associated with a first table comprising a starting logical block address and a size that, together, indicate a first set of logical block addresses each previously targeted by one or more write commands whose receipt satisfied a timing criterion;
    writing, to a cache, the first table based at least in part on the logical block address being associated with the first set of logical block addresses; and
    writing, to the cache based at least in part on writing the first table to the cache, a second table that is selected based at least in part on the second table indicating a mapping between physical block addresses and the first set of logical block addresses indicated by the starting logical block address and the size included in the first table.

2. The method of claim 1, wherein the first set of logical block addresses comprises numerically sequential logical block addresses.

3. The method of claim 2, wherein the timing criterion specifies a threshold duration between receipt of a write command that targets a first logical block address and receipt of a second write command that targets a second logical block that is numerically sequential to the first logical block address.

4. The method of claim 1, further comprising:
    writing, to the cache based at least in part on the first table, a third table indicating a third set of logical block addresses and corresponding physical block addresses, the third set of logical block addresses comprising logical block addresses from the first set of logical block addresses indicated by the first table.

5. The method of claim 4, further comprising:
    receiving a second read command for a second logical block address after loading the third table into the cache, the third table indicating a physical block address corresponding to the second logical block address.

6. The method of claim 1, further comprising:
    writing one or more values in the first table based at least in part on each of the logical block addresses in the first set of logical block addresses being targeted by a write command received within a threshold duration of time relative to a previous write command associated with a numerically sequential logical block address in the first set of logical block addresses.

7. The method of claim 1, further comprising:
    determining that the first table is associated with a third table indicating a third set of logical block addresses that were each previously targeted for one or more write operations in accordance with the timing criterion; and
    writing, to the cache, the third table based at least in part on determining that the first table is associated with the third table.

8. The method of claim 1, further comprising:
    determining a physical block address associated with the logical block address based at least in part on the second table; and
    performing a read operation on a set of memory cells associated with the physical block address.

9. A method performed by a memory system, comprising:
    receiving a write command targeting a logical block address;
    determining that the logical block address is associated with a table comprising a starting logical block address and a size that, together, indicate a set of logical block addresses each previously targeted by one or more write commands whose receipt satisfied a timing criterion; and updating the starting logical block address or the size associated with the table to indicate that the set of logical block addresses includes the logical block address based at least in part on the logical block address being numerically sequential to a numerically last logical block address indicated by the table and based at least in part on receipt of the write command satisfying the timing criterion relative to a previous write command associated with the set of logical block addresses.

10. The method of claim 9, wherein the set of logical block addresses comprises numerically sequential logical block addresses.

11. The method of claim 9, further comprising:
determining that the set of logical block addresses is associated with a size of data that satisfies a size threshold, wherein the table is updated based at least in part on the size of data satisfying the size threshold.

12. The method of claim 9, further comprising:
determining that a threshold amount of time has expired since receipt of the write command; and
updating, based at least in part on the threshold amount of time expiring, a second table to indicate that the set of logical block addresses includes the logical block address.

13. The method of claim 9, wherein determining that the logical block address is associated with the table comprises:
determining that the logical block address is numerically sequential to the numerically last logical block address of the set of logical block addresses indicated by the table.

14. The method of claim 9, wherein the logical block address is included in a second set of logical block addresses targeted by the write command, and wherein determining that the logical block address is associated with the set of logical block addresses comprises:
determining that the second set of logical block addresses numerically overlaps with the set of logical block addresses.

15. The method of claim 9, further comprising:
receiving a read command targeting the logical block address; and
writing the table to a cache of the memory system based at least in part on the read command and the logical block address being included in the table.

16. The method of claim 15, further comprising:
writing, to the cache based at least in part on the table, a second table indicating a second set of logical block addresses and corresponding physical block addresses, the second set of logical block addresses comprising logical block addresses from the set of logical block addresses indicated by the table.

17. The method of claim 15, further comprising:
determining a physical block address associated with the logical block address based at least in part on a mapping provided by the table; and
performing a read operation on a set of memory cells associated with the physical block address.

18. The method of claim 9, wherein the table indicates physical block addresses that correspond to the set of logical block addresses.

19. An apparatus, comprising:
a memory system comprising a cache; and
a controller coupled with the memory system and configured to cause the apparatus to:
determine that a logical block address targeted by a read command is associated with a first table comprising a starting logical block address and a size that, together, indicate a first set of logical block addresses each previously targeted by one or more write commands whose receipt satisfied a timing criterion;
write, to the cache, the first table based at least in part on the logical block address being associated with the first set of logical block addresses; and
write, to the cache based at least in part on writing the first table to the cache, a second table that is selected based at least in part on the second table indicating a mapping between physical block addresses and the first set of logical block addresses indicated by the starting logical block address and the size included in the first table.

20. The apparatus of claim 19, wherein the first set of logical block addresses comprises numerically sequential logical block addresses.

21. The apparatus of claim 19, wherein the timing criterion specifies a threshold duration between receipt of a write command that targets a first logical block address and receipt of a second write command that targets a second logical block that is numerically sequential to the first logical block address.

22. The apparatus of claim 19, wherein the controller is further configured to cause the apparatus to:
write, to the cache based at least in part on the first table, a third table indicating a third set of logical block addresses and corresponding physical block addresses, the third set of logical block addresses comprising logical block addresses from the first set of logical block addresses indicated by the first table.

23. The apparatus of claim 22, wherein the controller is further configured to cause the apparatus to:
receive a second read command for a second logical block address after loading the third table into the cache, the third table indicating a physical block address corresponding to the second logical block address.

24. The apparatus of claim 19, wherein the controller is further configured to cause the apparatus to:
write one or more values in the first table based at least in part on each of the logical block addresses in the first set of logical block addresses being targeted by a write command received within a threshold duration of time relative to a previous write command associated with a numerically sequential logical block address in the first set of logical block addresses.

25. The apparatus of claim 19, wherein the controller is further configured to cause the apparatus to:
determine that the first table is associated with a third table indicating a third set of logical block addresses that were each previously targeted for one or more write operations in accordance with the timing criterion; and
write, to the cache, the third table based at least in part on determining that the first table is associated with the third table.

* * * * *